US012783477B2

(12) United States Patent
Yarabolu

(10) Patent No.: US 12,783,477 B2
(45) Date of Patent: Nov. 3, 2026

(54) PRUNING A DATABASE USING GENETIC ALGORITHM

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 1198 days.

(21) Appl. No.: 17/824,015

(22) Filed: May 25, 2022

(65) Prior Publication Data

US 2023/0385251 A1 Nov. 30, 2023

(51) Int. Cl.
*G06F 16/21* (2019.01)
*G06F 16/215* (2019.01)
*G06F 16/23* (2019.01)
*G06N 3/086* (2023.01)

(52) U.S. Cl.
CPC ........ *G06F 16/215* (2019.01); *G06F 16/2365* (2019.01); *G06N 3/086* (2013.01)

(58) Field of Classification Search
CPC ... G06F 16/215; G06F 16/2365; G06N 3/086; G06N 5/01; G06N 3/126
See application file for complete search history.

(56) References Cited

U.S. PATENT DOCUMENTS 5,909,688 A 6/1999 Yoshioka et al.
7,124,105 B2 10/2006 Hilton
7,472,122 B2 12/2008 Ishida et al.
7,685,127 B2 3/2010 Gauweiler
8,064,432 B2 11/2011 O'Neil
8,355,794 B2 1/2013 Lineaweaver et al.
8,812,122 B2 8/2014 Lineaweaver et al.
(Continued)

FOREIGN PATENT DOCUMENTS

CA 2559860 C 6/2011
CN 103324862 B 2/2016
(Continued)

OTHER PUBLICATIONS

Genetic Algorithm, Article, https://en.wikipedia.org/wiki/Genetic_algorithm, Printed Mar. 12, 2024.

*Primary Examiner* — Omar F Fernandez Rivas
*Assistant Examiner* — Tri T Nguyen

(57) ABSTRACT

A database manager segments data stored in a database into a plurality of data segments and randomly combines the data segments into a plurality of data chromosomes that form an initial generation of a genetic algorithm. The database manager then runs multiple iterations of the genetic algorithm on the initial generation, wherein each iteration forms a new generation of data chromosomes based on data segments having the highest optimization metrics from a previous generation, wherein the optimization metric of a data segment represents a degree of importance of the data segment. When the genetic algorithm converges a fitness score is calculated for each data segment, wherein the fitness score of a data segment equals a number of iterations of the genetic algorithm the data segment survived before the genetic algorithm was terminated. Data is deleted from the database based on the fitness scores of the data segments.

17 Claims, 3 Drawing Sheets

(56) References Cited

U.S. PATENT DOCUMENTS

| | | | |
|---|---|---|---|
| 8,838,510 B2 | 9/2014 | Baughman et al. | |
| 9,189,506 B2 | 11/2015 | Gao et al. | |
| 9,244,838 B2 | 1/2016 | Lopes et al. | |
| 9,373,075 B2 | 6/2016 | Bufe, III et al. | |
| 9,460,186 B2 | 10/2016 | Liu et al. | |
| 9,672,241 B2 | 6/2017 | Dickie | |
| 10,073,887 B2 | 9/2018 | Chehreghani | |
| 10,140,359 B2 | 11/2018 | Beach et al. | |
| 10,410,111 B2 | 9/2019 | Husain | |
| 10,410,121 B2 | 9/2019 | Husain | |
| 10,592,153 B1 | 3/2020 | Subramaniam et al. | |
| 10,635,978 B2 | 4/2020 | Andoni et al. | |
| 10,708,120 B2 | 7/2020 | Anerousis et al. | |
| 10,846,623 B2 | 11/2020 | Adjaoute | |
| 10,909,096 B2 | 2/2021 | Jaiswal et al. | |
| 10,929,777 B2 | 2/2021 | Adjaoute | |
| 10,984,423 B2 | 4/2021 | Adjaoute | |
| 11,074,503 B2 | 7/2021 | Andoni et al. | |
| 11,100,403 B2 | 8/2021 | Andoni et al. | |
| 11,106,978 B2 | 8/2021 | Andoni et al. | |
| 11,132,341 B2 | 9/2021 | Marwah et al. | |
| 11,551,100 B1 * | 1/2023 | Ernest | G06N 5/048 |
| 12,314,863 B1 * | 5/2025 | Fang | G06N 20/00 |
| 2007/0021918 A1 * | 1/2007 | Natsoulis | G16B 25/30 702/19 |
| 2016/0078367 A1 | 3/2016 | Adjaoute | |
| 2016/0086185 A1 | 3/2016 | Adjaoute | |
| 2016/0171401 A1 * | 6/2016 | Wu | G06Q 10/06315 705/7.22 |
| 2017/0024497 A1 * | 1/2017 | Lyu | G06F 30/20 |
| 2017/0053014 A1 | 2/2017 | Lavallee | |
| 2017/0147722 A1 * | 5/2017 | Greenwood | G06N 3/126 |
| 2018/0165316 A1 | 6/2018 | Chen et al. | |
| 2019/0253767 A1 | 8/2019 | Westbrook et al. | |
| 2021/0117803 A1 | 4/2021 | Husain | |
| 2022/0114464 A1 | 4/2022 | Yang et al. | |

FOREIGN PATENT DOCUMENTS

| | | |
|---|---|---|
| CN | 104636417 B | 10/2017 |
| CN | 104765731 B | 5/2018 |
| CN | 105550751 B | 5/2018 |
| CN | 105786955 B | 4/2019 |
| CN | 105989195 B | 9/2019 |
| EP | 1850277 B1 | 10/2012 |
| EP | 3014488 A | 5/2016 |
| JP | 06314299 A | 11/1994 |
| JP | 2003223344 A | 8/2003 |
| JP | 6707797 B2 | 6/2020 |
| RU | 2663358 C2 | 8/2018 |
| WO | 2021057824 A1 | 4/2021 |

* cited by examiner

PRUNING A DATABASE USING GENETIC ALGORITHM

TECHNICAL FIELD

The present disclosure relates generally to data processing, and more specifically to pruning a database using a genetic algorithm.

BACKGROUND

Organizations generally store data obtained from several sources. The data may include personal information of users such as employee information or client and partner information. Over time, organizations accumulate a lot of data which can become outdated and/or irrelevant. For example, employees may change name, address, declare new dependents and be promoted. Additionally, data occupies expensive memory space which needs to be optimized. Thus, organizations periodically go through all the data within a database and remove information that is incomplete, incorrect, improperly formatted, duplicated, or irrelevant. Presently, a basic rule followed to delete data includes deleting the oldest data first. However, older data may be useful and deleting such data may negatively affect certain systems and processes. As data is the most fundamental resource for any organization, there is a need for a more rational method for purging data.

SUMMARY

The system and methods implemented by the system as disclosed in the present disclosure provide a technique for pruning out unwanted data from a database, intelligently and automatically. The disclosed system and methods provide several practical applications and technical advantages.

For example, the disclosed system and methods provide the practical application of automatically and intelligently deleting data from a database. As disclosed in accordance with aspects of the present disclosure a database manager may be configured to delete data that is incomplete, incorrect, improperly formatted, duplicated, irrelevant, unimportant or no longer needed. To prune the data from the database, database manager processes the data using a genetic algorithm that simulates the process of natural selection. The database manager segments the data into a plurality of data segments and randomly combines the data segments into a plurality of data chromosomes that form an initial generation of the genetic algorithm. The database manager then runs multiple iterations of the genetic algorithm on the initial generation, wherein each iteration forms a new generation of data chromosomes based on data segments having the highest optimization metrics from the previous generation, wherein the optimization metric of a data segment represents a degree of importance of the data segment. When the genetic algorithm converges, the latest generation includes data segments having the highest optimization metrics. A fitness score is calculated for each data segment, wherein the fitness score of a data segment equals a number of iterations of the genetic algorithm the data segment survived before the genetic algorithm was terminated. Data from data segments with lower fitness scores is then deleted from the database. By deleting unwanted data from the database, the disclosed system and methods improve memory utilization of a computing system (e.g., server) that stores the database.

The disclosed system and methods provide an additional technical advantage of improving query performance of the database. Deleting unwanted data from the database means that less data needs to be processed to service a database query, which improves query processing and response times.

The disclosed system and methods provide an additional technical advantage of avoiding processing errors relating to processing data in the database. As described in accordance with embodiments of the present disclosure, data is deleted from the database based on a degree of importance of the data. This helps ensure that critical data or data that is needed to execute one or more processing steps is not deleted from the database. By not deleting data that may be needed for one or more processing steps, the present system and methods help avoid processing errors which may otherwise occur as a result of deleting critical data from the database. Thus, the disclosed system and methods provide the additional technical advantage of improving performance of a computing system configured to manage the database. By improving query performance and avoiding processing errors the present system and methods generally improve processing performance of a computing system storing and managing the database. Thus, the disclosed system and methods improve the technology related to database management.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
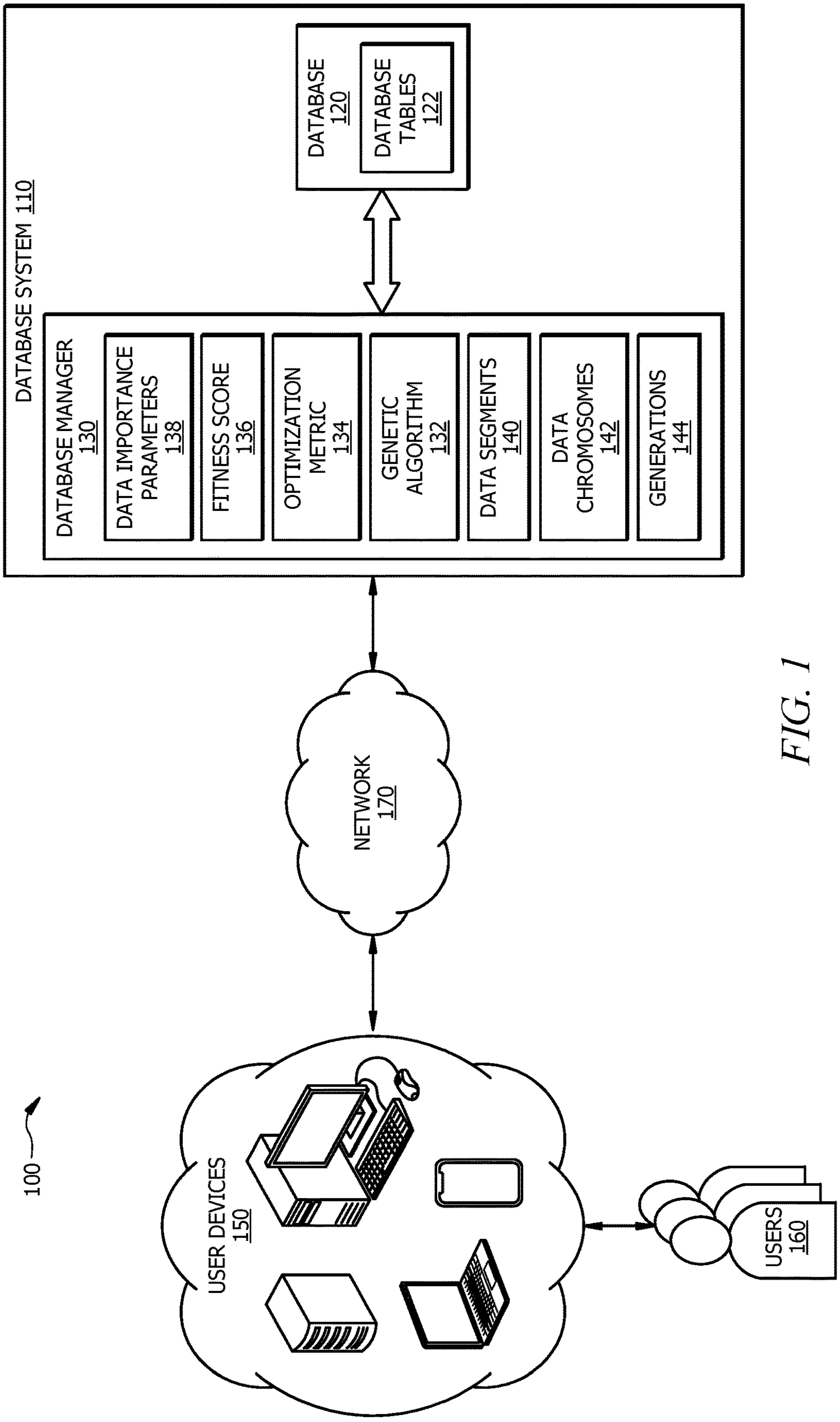
FIG. 1 is a schematic diagram of an example data processing system, in accordance with one or more embodiments of the present disclosure.

FIG. 1 is a schematic diagram of an example data processing system 100, in accordance with one or more embodiments of the present disclosure.

As shown in FIG. 1, data processing system 100 may include a database system 110 and one or more user devices 150, each connected to a network 170. The network 170, in general, may be a wide area network (WAN), a personal area network (PAN), a cellular network, or any other technology that allows devices to communicate electronically with other devices. In one or more embodiments, the network 170 may be the Internet. Each user device 150 may be operated by one or more users 160. Each user device 150 may be a computing device that can be operated by a user 160 and communicate with other devices connected to the network 170.

In one or more embodiments, each of the database system 110 and user devices 150 may be implemented by a computing device running one or more software applications. For example, one or more of the database system 110 and user devices 150 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the database system 110 and user devices 150 may be representative of a server running one or more software applications to implement respective functionality as described below. In certain embodiments, one or more of the database system 110 and user devices 150 may run a thin client software application where the processing is directed by the thin client but largely performed by a central entity such as a server (not shown).

In one embodiment, the database system 110 may be a standalone computing device (e.g., desktop computer, laptop computer, mobile computing device etc.) directly connected to or including a display device (e.g., a desktop monitor, laptop screen, smartphone screen etc.) and a user interface device (e.g., keyboard, computer mouse, touchpad etc.) allowing a user 160 to interact with the computing device.

Database system 110 includes database 120 and database manager 130 communicatively coupled to each other. Database 120 may store one or more database tables 122. Each database table 122 may be a database object that contains at least a portion of data stored in the database 120. In each database table 122, data may be logically organized in a row-and-column format similar to a spreadsheet. Each row represents a unique data record, and each column represents a field in the record. For example, a database table 122 that contains employee data for a company may contain a row for each employee and columns representing employee information such as employee number, name, joining date, address, job title, and home telephone number. Each column of a database table may be referred to as a data type as each column includes a type of data relating to each data record or row. It may be noted that the terms "data type" and "column" are interchangeably used throughout the present disclosure. Database 120 may be queried using database queries (e.g., SQL query) to extract desired data stored in the database tables 122. A user 160 may use a user device 150 to define one or more query parameters of a database query. Query parameters are generally search parameters based on which the database 120 is to be searched for desired data. For example, a user interface provided on the user device 150 may allow the user 160 to enter or select one or more query parameters. A database query may be built (e.g., by a software application provided at the user device) based on the query parameters. The database query may be transmitted to the database system (e.g., over the network 170). The database system 110 may search the database 120 (e.g., database tables 122) based on the database query, extract data from one or more database tables 122 based on the query parameters of the database query and transmit back the extracted data to the user device 150.

Database manager 130 may be configured to delete data from database 120 (e.g., stored in one or more database tables 122) automatically and intelligently. For example, database manager 130 may be configured to delete data that is incomplete, incorrect, improperly formatted, duplicated, irrelevant, unimportant or no longer needed. In one or more embodiments, to help prune out data from database 120, database manager 130 may be configured to process the data stored in the database 120 or portion thereof using a genetic algorithm 132 in accordance with a pre-determined schedule (e.g., periodically). Genetic algorithms typically are adaptive heuristic search algorithms that belong to the larger part of evolutionary algorithms. Genetic algorithms simulate the process of natural selection which means those species who can adapt to changes in their environment are able to survive and reproduce and go to next generation. In other words, a genetic algorithms simulate "survival of the fittest" among individuals of consecutive generations for solving a problem.

Upon initializing (e.g., in response to a request made by a user 160 using a user device 150), genetic algorithm 132 is configured to randomly divide a selected portion of data (e.g., from one or more database tables 122) from the database 120 into a plurality of data segments 140. Each data segment 140 is analogous to a biological gene and represents a data gene of the genetic algorithm 132. A data segment 140 may include a data type/column of a database table 122 or a data record/row of a database table 122. Genetic algorithm 132 randomly combines the data segments 140 to generate an initial set of data chromosomes 142 that represent an initial generation/population 144 for the genetic algorithm 132. For example, each data chromosome 142 may include multiple (e.g., two or more) data segments 140. Each data chromosome 142 is analogous to a biological chromosome of an individual. Thus, each generation 144 of the genetic algorithm 132 includes a set of individuals, wherein each individual is represented by a data chromosome 142. In other words, each generation 144 is represented by a respective set of data chromosomes 142. Once the initial generation is formed, genetic algorithm 132 may run a plurality of iterations of steps including determining an optimization metric 134 for each data segment 140 included in a current generation, select one or more data segments 140 from the current generation based on the optimization metrics 134 of the data segments 140, and generate a new set of data chromosomes 142 that form the next generation by replacing one or more data segments 140 in data chromosomes 142 of the current generation with the selected data segments 140. The steps of each iteration will not be described in more detail. It may be noted that the terms, "gene", "data gene" and "data segment" may be interchangeably used throughout this disclosure. Similarly, the terms "chromosome" and "data chromosome" may be interchangeably used throughout this disclosure.

Genetic algorithm 132 may determine an optimization metric 134 for each data segment included in a current generation. A current generation is a generation 144 that was generated in the latest iteration run by the genetic algorithm 132. A current generation is a previous generation to a next generation that was generated in a next iteration. An optimization metric 134 of a data segment 140 indicates to what degree the data segment 140 satisfies an optimization criteria that may include a one or more data importance parameters 138. A higher optimization metric 134 indicates a higher importance. Data importance parameters 138 may include a plurality of importance parameters 138, wherein each data importance parameter 138 indicates whether a data segment 140 is a certain type of data. For example, data importance parameters 138 may include, but are not limited to, whether data is needed for regularity compliance, whether data is critical for data integrity, whether data contributes towards completeness of data, whether data is redundant, whether data is unique, whether data is used by one or more partners, whether data has importance in market and can generate revenue, whether data can help in fraud detection, whether data is required for future organizational expansion/decisions, whether data is no longer needed as a result of unexpected events, whether data is no longer needed as a result of explicit decisions, whether data includes high size—low value data such as video streams, whether data is unique/scarce such that other organizations do not possess such data, whether data is universally available (e.g., data relating to population, weather conditions of countries etc.), whether data is of real-time nature and not advisable to store locally (e.g., current weather condition of each city), whether data includes unstructured data that is expensive to process. Each data importance parameter 138 indicates whether a piece of data (e.g., data segment 140) is important for a specific purpose or a category. For example, when a data segment 140 includes data that is needed for regulatory compliance, database manager 130 may determine that the data segment is important for compliance purposes. In another example, when a data segment 140 includes data that is critical for data integrity (e.g., calculation of other data parameters depends on data from this data segment), database manager 130 may determine that the data segment 140 is important from a data rules perspective. database manager 130 may be configured to determine whether a data segment corresponds any one or more of the data importance parameters 138.

Database manager 130 may be configured to determine an optimization metric 134 for a data segment 140 based on how many data importance parameters 138 the data segment 140 corresponds to, wherein the more data importance parameters 138 a data segment 140 corresponds to, higher is the optimization metric 134 of the data segment 140. A higher optimization metric 134 indicates a higher degree of importance and a lower optimization metric 134 indicates a lower degree of importance. For example, optimization metric 134 of a data segment including data that is critical for data integrity and includes no redundant data is higher than the optimization metric 134 of a data segment 140 including data that is critical for data integrity but is redundant. In one example embodiment, optimization metric 134 may include a numerical optimization score, wherein a numerical score is assigned to a data segment for correspondence with each data importance parameter 138. For example, a score of '1' may be assigned to a data segment 140 for correspondence with each data importance parameter 138. Thus, when a data segment 140 includes data that is critical for data integrity and includes no redundant data, database manager 130 may assign an optimization score of '2' as the data segment 140 corresponds to two different data importance parameters 138. In one embodiment, different weights may be assigned to different data importance parameters 138. For example, a weight of '2' may be assigned to data integrity and a weight of '1' may be assigned to data redundancy. Thus, a data segment 140 including data that is critical for data integrity and includes no redundant data is assigned an optimization score of (2+1=3). This allows an administrator to set higher weights for certain data importance parameters 138 that need to be given higher importance over one or more other data importance parameters 138. It may be noted that assigning numerical optimization scores to data segments is one example method for determining the optimization metric 134, and that the optimization metric may be determined using any method that assigns an importance measure to a data segment based on correspondence with one or more data importance parameters 138. In one or more embodiments, database manager 130 may be configured to generate a combined optimization metric 134 for a data chromosome 142, for example, by combining the optimization metrics 134 of data segments 140 included in the data chromosome 142. For example, database manager 130 may determine a combined optimization metric 134 of a data chromosome 142 by adding the optimization scores of individual data segments 140 that form the data chromosome 142.

Genetic algorithm 132 may generate a next generation 144 by generating a next set of data chromosomes 142 (often referred to as an offspring) based on the previous set of data chromosomes 142 of the previous generation 144. Genetic algorithm 132 may generate a next generation 144 of data chromosomes 142 using a cross-over operator, a mutation operator or a combination thereof. In one embodiment, genetic algorithm 132 generates one or more data chromosomes 142 of the next generation using the cross-over operator and generates one or more data chromosomes 142 of the next generation using the mutation operator. The mutation operator is analogous to mating between individuals. In one embodiment, the term "operator" may correspond to a subroutine or a piece of software code implementing a particular logic/algorithm. To generate a data chromosome 142 (e.g., offspring) for the next generation, the genetic algorithm 132 selects one or more parent data chromosomes 142 from the previous generation and combines the parent data chromosomes 142 to generate one or more new/offspring data chromosomes 142. Genetic algorithm 132 may use a selection operator to select parent data chromosomes 142 from the previous generation. The selection operator gives preference to data chromosomes 142 from the previous generation having the highest combined optimization metric 134, meaning the selection operator prioritizes those data chromosomes 142 that include data segments 140 having high optimization metric 134. For example, selection operator selects a plurality (e.g., predetermined number) of data chromosomes 142 having the highest combined optimization metrics 134. In one embodiment, the selection operator may select data chromosomes 142 having a combined optimization metric 134 that equals or exceeds a threshold optimization metric. Cross-over operator may combine two parent data chromosomes 142 from this selected pool of data chromosomes 142 to generate an offspring data chromosome 142. To generate an offspring data chromosome 142, the cross-over operator may replace one or more data segments 140 of a first parent data chromosome with data segments 140 from a second parent data chromosomes. In one embodiment, the cross-over operator may replace one or more data segments 140 having the lowest optimization metric 134 among all data segments 140 of the first parent data chromosome 142 with one or more data segments 140 having the highest optimization metric 134 among all the data segments 140 of the second parent data chromosome 142. In one embodiment, cross-over operator may randomly combine any two parent data chromosomes 142 from this selected pool of data chromosomes 142 to generate an offspring data chromosome 142. In an additional or alternative embodiment, the cross-over operator may randomly select data segments 140 of a first parent data chromosome 142 that are to be replaced with data segments 140 having the highest optimization metrics 134 from a second parent data chromosome 142.

The mutation operator may generate an offspring data chromosome 142 by randomly inserting one or more data segments 140 in a parent data chromosome 142 (e.g., selected by the selection operator). The mutation operator may randomly select data segments 140 of a parent data chromosome 142 that are to be replaced by a replacement data chromosome. Additionally or alternatively, a data segment 140 that replaces a data segment 140 of the parent data chromosome 142 is a data segment 140 having the highest optimization metric 134 among data segments 140 of another parent data chromosome 142, having an optimization metric 134 that is above a threshold optimization metric from another parent data chromosome 142 or any random data segment 140 included in the initial generation or any previous generation. A data segment 140 being replaced may be a data segment 140 having the lowest optimization metric 134 among all data segments 140 of another parent data chromosome 142 or any random data segment 140.

Thus, progressively with every iteration of the genetic algorithm 132 the generations 144 converge towards a population of data chromosomes 142 having higher combined optimization metrics and including data segments 140 having higher optimization scores 134 as compared to the previous generations 144. It may be noted that data segments 140 of a previous generation that are not used to form the next generation are eliminated by the genetic algorithm 132. Since, at every iteration the genetic algorithm 132 selects data segments 140 having the highest optimization scores for generating data chromosomes 142 of the next generation, data segments 140 having the lowest or relative lower optimization scores 134 are progressively eliminated from the population of data chromosomes 142.

Genetic algorithm 132 continues to run the iterations including generating new generations and determining optimization metrics 134 for data segments 140 and data chromosomes 142 until the generations 144 have converged. The genetic algorithm 132 may determine that the generations 144 have converged when offspring data chromosomes 142 produced for a current generation have no significant difference from data chromosomes 142 of the previous one or more generations 144. Genetic algorithm 132 may compare data chromosomes 142 of each newly formed generation 144 with data chromosomes 142 of one or more previous generations 144. Genetic algorithm 132 may terminate the iterations in response to detecting that offspring data chromosomes 142 produced for a newly formed generation have no significant difference from offspring data chromosomes 142 of the previous one or more generations 144. For example, genetic algorithm 132 may determine that offspring data chromosomes 142 produced for a newly formed generation have no significant difference from offspring data chromosomes 142 of the previous one or more generations 144, when the optimization metrics 134 of the data chromosomes in the generations are same/similar, or when the optimization metrics 134 have no significant improvement over two or more generations 144.

Database manager 130 may be configured to calculate and record a fitness score 136 for each data segment 140 initially generated for inclusion in the initial generation. The fitness score 136 of a data segment 140 equals a number of iterations of the genetic algorithm 132 the data segment 140 survived before the genetic algorithm 132 was terminated (e.g., upon generations converging). A data segment 140 is determined to have survived an iteration when the data segment is part of the next generation. For example, when a data segment 140 is eliminated after 3 iterations, the database manager 130 determines the fitness score 136 of the data segment 140 as 3. In one embodiment, the database manager may maintain a fitness score counter for each data segment 140 and increment the counter after each iteration of the genetic algorithm 132 if the data segment 140 survives the iteration. Database manager 130 may stop the fitness counter for a data segment 140 when the data segment is not included in a next generation or when the genetic algorithm 132 is terminated after the generations have converged.

Once the genetic algorithm 132 is terminated after the generations have converged and the final fitness scores 136 of each data segment 140 have been recorded, database manager 130 may be configured to determine which data segments 140 can be deleted based on the fitness scores 136 of the data segments 140. In one or more embodiments, for each data segment 140 database manager 130 determines whether the fitness score 136 of the data segment 140 equals or is below a threshold fitness score. When the fitness score 136 of the data segment 140 equals or is below the threshold fitness score, database manager 130 performs an impact analysis including determining an impact of deleting the database manager 130 on a computing infrastructure or processes performed by the computing infrastructure. For example, one or more processing steps of at least one software application may need at least a portion of data from the data segment 140. If the data segment 140 is not needed for any processing step of any software application, database manager 130 determines that deleting the data segment 140 has no impact and marks the data segment 140 for deletion. On the other hand, if at least a portion of data from the data segment 140 is needed to perform at least one processing step of at least one software application, database manager 130 determines a degree of impact associated with deleting the data segment 140. If the degree of impact associated with deleting the data segment 140 equals or is below a threshold impact, data manager 130 determines that the degree of impact is acceptable and marks the data segment 140 for deletion. However, if the degree of impact associated with deleting the data segment 140 is above the threshold impact, database manager 130 decides that the data segment 140 is not to be deleted. In one embodiment, when purging of data from the database 120 is being performed (e.g., in accordance with techniques discussed in this disclosure) as a result of insufficient memory, database manager 130 may recommend that data storage space in the database 120 be increased to accommodate data segments 140 that cannot be deleted (e.g., as a result of high degree of impact). In one or more embodiments, in response to determining that the degree of impact associated with deleting the data segment 140 equals or is below the impact threshold, database manager 130 requests approval to delete the data segment and marks the data segment for deletion upon receiving the approval. Database manager 130 may be configured to automatically delete all data segment 140 that are marked for deletion or the data segments 140 maybe manually deleted by an administrator.

In one or more embodiments, in response to determining that the fitness score 136 of the data segment 140 equals or is below the threshold fitness score, database manager 130 marks the data segment for deletion without performing an impact analysis as described above.

Figure 2:
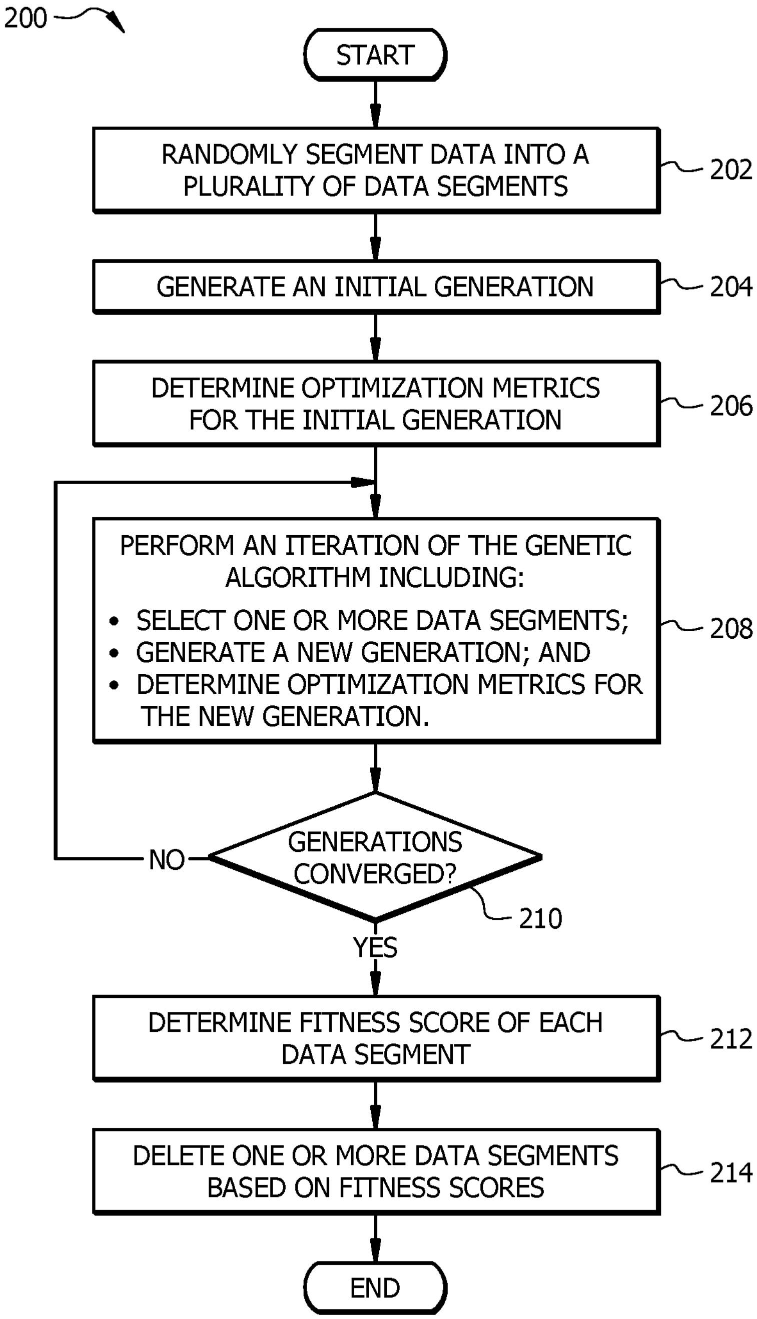
FIG. 2 is a flowchart of an example method for pruning out data from a database, in accordance with one or more embodiments of the present disclosure.

FIG. 2 is a flowchart of an example method 200 for pruning out data from a database (e.g., database 120), in accordance with one or more embodiments of the present disclosure. Method 200 may be performed by the database manager 130 as shown in FIG. 1 and described above.

At operation 202, database manager 130 randomly segments data stored in a database 120 into a plurality of data segments 140. As described above, upon initializing, genetic algorithm 132 is configured to randomly divide a selected portion of data (e.g., from one or more database tables 122) from the database 120 into a plurality of data segments 140. Each data segment 140 is analogous to a biological gene and represents a gene of the genetic algorithm 132. A data segment 140 may include a data type/column of a database table 122 or a data record/row of a database table 122.

At operation 204, database manager 130 randomly combines the data segments 140 into a plurality of data chromosomes 142, wherein the plurality of data chromosomes 142 represents an initial generation for a genetic algorithm 132. As described above, genetic algorithm 132 randomly combines the data segments 140 to generate an initial set of data chromosomes 142 that represent an initial generation/population 144 for the genetic algorithm 132. For example, each data chromosome 142 may include multiple (e.g., two or more) data segments 140. Each data chromosome 142 is analogous to a biological chromosome of an individual. Thus, each generation 144 of the genetic algorithm 132 includes a set of individuals, wherein each individual is represented by a data chromosome 142. In other words, each generation 144 is represented by a respective set of data chromosomes 142.

At operation 206 database manager 130 determines an optimization metric 134 for each data segment 140 of the plurality of data chromosomes 142 in the initial generation.

As described above, optimization metric 134 of a data segment 140 indicates to what degree the data segment 140 satisfies an optimization criteria which may include a one or more data importance parameters 138. A higher optimization metric 134 indicates a higher importance. Data importance parameters 138 may include a plurality of importance parameters 138, wherein each data importance parameter 138 indicates whether a data segment 140 is a certain type of data. For example, data importance parameters 138 may include, but are not limited to, whether data is needed for regularity compliance, whether data is critical for data integrity, whether data contributes towards completeness of data, whether data is redundant, whether data is unique, whether data is used by one or more partners, whether data has importance in market and can generate revenue, whether data can help in fraud detection, whether data is required for future organizational expansion/decisions, whether data is no longer needed as a result of unexpected events, whether data is no longer needed as a result of explicit decisions, whether data includes high size—low value data such as video streams, whether data is unique/scarce such that other organizations do not possess such data, whether data is universally available (e.g., data relating to population, weather conditions of countries etc.), whether data is of real-time nature and not advisable to store locally (e.g., current weather condition of each city), whether data includes unstructured data that is expensive to process. Each data importance parameter 138 indicates whether a piece of data (e.g., data segment 140) is important for a specific purpose or a category. For example, when a data segment 140 includes data that is needed for regulatory compliance, database manager 130 may determine that the data segment is important for compliance purposes. In another example, when a data segment 140 includes data that is critical for data integrity (e.g., calculation of other data parameters depends on data from this data segment), database manager 130 may determine that the data segment 140 is important from a data rules perspective. Database manager 130 may be configured to determine whether a data segment corresponds any one or more of the data importance parameters 138.

Database manager 130 may be configured to determine an optimization metric 134 for a data segment 140 based on how many data importance parameters 138 the data segment 140 corresponds to, wherein the more data importance parameters 138 a data segment 140 corresponds to, higher is the optimization metric 134 of the data segment 140. A higher optimization metric 134 indicates a higher degree of importance and a lower optimization metric 134 indicates a lower degree of importance. For example, optimization metric 134 of a data segment including data that is critical for data integrity and includes no redundant data is higher than the optimization metric 134 of a data segment 140 including data that is critical for data integrity but is redundant. In one example embodiment, optimization metric 134 may include a numerical optimization score, wherein a numerical score is assigned to a data segment for correspondence with each data importance parameter 138. For example, a score of '1' may be assigned to a data segment 140 for correspondence with each data importance parameter 138. Thus, when a data segment 140 includes data that is critical for data integrity and includes no redundant data, database manager 130 may assign an optimization score of '2' as the data segment 140 corresponds to two different data importance parameters 138. In one embodiment, different weights may be assigned to different data importance parameters 138. For example, a weight of '2' may be assigned to data integrity and a weight of '1' may be assigned to data redundancy. Thus, a data segment 140 including data that is critical for data integrity and includes no redundant data is assigned an optimization score of (2+1=3). This allows an administrator to set higher weights for certain data importance parameters 138 that need to be given higher importance over one or more other data importance parameters 138. It may be noted that assigning numerical optimization scores to data segments is one example method for determining the optimization metric 134, and that the optimization metric may be determined using any method that assigns an importance measure to a data segment based on correspondence with one or more data importance parameters 138. In one or more embodiments, database manager 130 may be configured to generate a combined optimization metric 134 for a data chromosome 142, for example, by combining the optimization metrics 134 of data segments 140 included in the data chromosome 142. For example, database manager 130 may determine a combined optimization metric 134 of a data chromosome 142 by adding the optimization scores of individual data segments 140 that form the data chromosome 142.

At operation 208, database manager 130 performs at least one iteration of the genetic algorithm. As described above, once the initial generation is formed, genetic algorithm 132 may run a plurality of iterations of steps including determining an optimization metric 134 for each data segment 140 included in a current generation, select one or more data segments 140 from the current generation based on the optimization metrics 134 of the data segments 140, and generate a new set of data chromosomes 142 that form the next generation by replacing one or more data segments 140 in data chromosomes 142 of the current generation with the selected data segments 140. The steps of each iteration will not be described in more detail. For example, in each iteration, genetic algorithm 132 may determine an optimization metric 134 (as described above) for each data segment included in a current generation. A current generation is a generation 144 that was generated in the latest iteration run by the genetic algorithm 132. A current generation is a previous generation to a next generation that was generated in a next iteration.

In each iteration, genetic algorithm 132 may generate a next generation 144 by generating a next set of data chromosomes 142 (often referred to as an offspring) based on the previous set of data chromosomes 142 of the previous generation 144. Genetic algorithm 132 may generate a next generation 144 of data chromosomes 142 using a cross-over operator, a mutation operator or a combination thereof. In one embodiment, genetic algorithm 132 generates one or more data chromosomes 142 of the next generation using the cross-over operator and generates one or more data chromosomes 142 of the next generation using the mutation operator. The mutation operator is analogous to mating between individuals. In one embodiment, the term "operator" may correspond to a subroutine or a piece of software code implementing a particular logic/algorithm. To generate a data chromosome 142 (e.g., offspring) for the next generation, the genetic algorithm 132 selects one or more parent data chromosomes 142 from the previous generation and combines the parent data chromosomes 142 to generate one or more new/offspring data chromosomes 142. Genetic algorithm 132 may use a selection operator to select parent data chromosomes 142 from the previous generation. The selection operator gives preference to data chromosomes 142 from the previous generation having the highest combined optimization metric 134, meaning the selection operator prioritizes those data chromosomes 142 that include data segments 140 having high optimization metric 134. For example, selection operator selects a plurality (e.g., predetermined number) of data chromosomes 142 having the highest combined optimization metrics 134. In one embodiment, the selection operator may select data chromosomes 142 having a combined optimization metric 134 that equals or exceeds a threshold optimization metric. Cross-over operator may combine two parent data chromosomes 142 from this selected pool of data chromosomes 142 to generate an offspring data chromosome 142. To generate an offspring data chromosome 142, the cross-over operator may replace one or more data segments 140 of a first parent data chromosome with data segments 140 from a second parent data chromosomes. In one embodiment, the cross-over operator may replace one or more data segments 140 having the lowest optimization metric 134 among all data segments 140 of the first parent data chromosome 142 with one or more data segments 140 having the highest optimization metric 134 among all the data segments 140 of the second parent data chromosome 142. In one embodiment, cross-over operator may randomly combine any two parent data chromosomes 142 from this selected pool of data chromosomes 142 to generate an offspring data chromosome 142. In an additional or alternative embodiment, the cross-over operator may randomly select data segments 140 of a first parent data chromosome 142 that are to be replaced with data segments 140 having the highest optimization metrics 134 from a second parent data chromosome 142.

The mutation operator may generate an offspring data chromosome 142 by randomly inserting one or more data segments 140 in a parent data chromosome 142 (e.g., selected by the selection operator). The mutation operator may randomly select data segments 140 of a parent data chromosome 142 that are to be replaced by a replacement data chromosome. Additionally or alternatively, a data segment 140 that replaces a data segment 140 of the parent data chromosome 142 is a data segment 140 having the highest optimization metric 134 among data segments 140 of another parent data chromosome 142, having an optimization metric 134 that is above a threshold optimization metric from another parent data chromosome 142 or any random data segment 140 included in the initial generation or any previous generation. A data segment 140 being replaced may be a data segment 140 having the lowest optimization metric 134 among all data segments 140 of another parent data chromosome 142 or any random data segment 140.

Thus, progressively with every iteration of the genetic algorithm 132 the generations 144 converge towards a population of data chromosomes 142 having higher combined optimization metrics and including data segments 140 having higher optimization scores 134 as compared to the previous generations 144. It may be noted that data segments 140 of a previous generation that are not used to form the next generation are eliminated by the genetic algorithm 132. Since, at every iteration the genetic algorithm 132 selects data segments 140 having the highest optimization scores for generating data chromosomes 142 of the next generation, data segments 140 having the lowest or relative lower optimization scores 134 are progressively eliminated from the population of data chromosomes 142.

At operation 210, at the end of each iteration (e.g., after a next generation has been generated) database manager 130 (e.g., using genetic algorithm 132) may determine whether the genetic algorithm 132 (e.g., generations) has converged. As described above, genetic algorithm 132 continues to run the iterations (e.g., in operation 208) including generating new generations and determining optimization metrics 134 for data segments 140 and data chromosomes 142 until the generations 144 have converged. The genetic algorithm 132 may determine that the generations 144 have converged when offspring data chromosomes 142 produced for a current generation have no significant difference from data chromosomes 142 of the previous one or more generations 144. The genetic algorithm 132 is said to have converged when the generations have converged. Genetic algorithm 132 may compare data chromosomes 142 of each newly formed generation 144 with data chromosomes 142 of one or more previous generations 144. Genetic algorithm 132 may terminate the iterations in response to detecting that offspring data chromosomes 142 produced for a newly formed generation have no significant difference from offspring data chromosomes 142 of the previous one or more generations 144. For example, genetic algorithm 132 may determine that offspring data chromosomes 142 produced for a newly formed generation have no significant difference from offspring data chromosomes 142 of the previous one or more generations 144, when the optimization metrics 134 of the data chromosomes in the generations are same/similar, or when the optimization metrics 134 have no significant improvement over two or more generations 144. Upon determining that the generations have not converged, method 200 runs another iteration at operation 208. On the other hand, upon determining that the generations have converged, method 200 proceeds to operation 212.

At operation 212, database manager 130 determines a fitness score 136 of each data segment 140 from the initial generation, wherein the fitness score of the data segment 140 is a number of iterations of the genetic algorithm 132 the data segment 140 was not eliminated. As described above, database manager 130 may be configured to calculate and record a fitness score 136 for each data segment 140 initially generated for inclusion in the initial generation. The fitness score 136 of a data segment 140 equals a number of iterations of the genetic algorithm 132 the data segment 140 survived before the genetic algorithm 132 was terminated (e.g., upon generations converging). A data segment 140 is determined to have survived an iteration when the data segment is part of the next generation. For example, when a data segment 140 is eliminated after 3 iterations, the database manager 130 determines the fitness score 136 of the data segment 140 as 3. In one embodiment, the database manager 130 may maintain a fitness score counter for each data segment 140 and increment the counter after each iteration of the genetic algorithm 132 if the data segment 140 survives the iteration. Database manager 130 may stop the fitness counter for a data segment 140 when the data segment is not included in a next generation or when the genetic algorithm 132 is terminated after the generations have converged.

At operation 214, database manager deletes one or more data segments 140 (or portions thereof) from the database 120 based on the fitness scores 136 of the data segments 140. As described above, once the genetic algorithm 132 is terminated after the generations have converged and the final fitness scores 136 of each data segment 140 have been recorded, database manager 130 may be configured to determine which data segments 140 can be deleted based on the fitness scores 136 of the data segments 140. In one or more embodiments, for each data segment 140 database manager 130 determines whether the fitness score 136 of the data segment 140 equals or is below a threshold fitness score. When the fitness score 136 of the data segment 140 equals or is below the threshold fitness score, database manager 130 performs an impact analysis including determining an impact of deleting the database manager 130 on a computing infrastructure or processes performed by the computing infrastructure. For example, one or more processing steps of at least one software application may need at least a portion of data from the data segment 140. If the data segment 140 is not needed for any processing step of any software application, database manager 130 determines that deleting the data segment 140 has no impact and marks the data segment 140 for deletion. On the other hand, if at least a portion of data from the data segment 140 is needed to perform at least one processing step of at least one software application, database manager 130 determines a degree of impact associated with deleting the data segment 140. If the degree of impact associated with deleting the data segment 140 equals or is below a threshold impact, data manager 130 determines that the degree of impact is acceptable and marks the data segment 140 for deletion. However, if the degree of impact associated with deleting the data segment 140 is above the threshold impact, database manager 130 decides that the data segment 140 is not to be deleted. In one embodiment, when purging of data from the database 120 is being performed (e.g., in accordance with techniques discussed in this disclosure) as a result of insufficient memory, database manager 130 may recommend that data storage space in the database 120 be increased to accommodate data segments 140 that cannot be deleted (e.g., as a result of high degree of impact). In one or more embodiments, in response to determining that the degree of impact associated with deleting the data segment 140 equals or is below the impact threshold, database manager 130 requests approval to delete the data segment and marks the data segment for deletion upon receiving the approval. Database manager 130 may be configured to automatically delete all data segment 140 that are marked for deletion or the data segments 140 maybe manually deleted by an administrator.

In one or more embodiments, in response to determining that the fitness score 136 of the data segment 140 equals or is below the threshold fitness score, database manager 130 marks the data segment for deletion without performing an impact analysis as described above.

Figure 3:
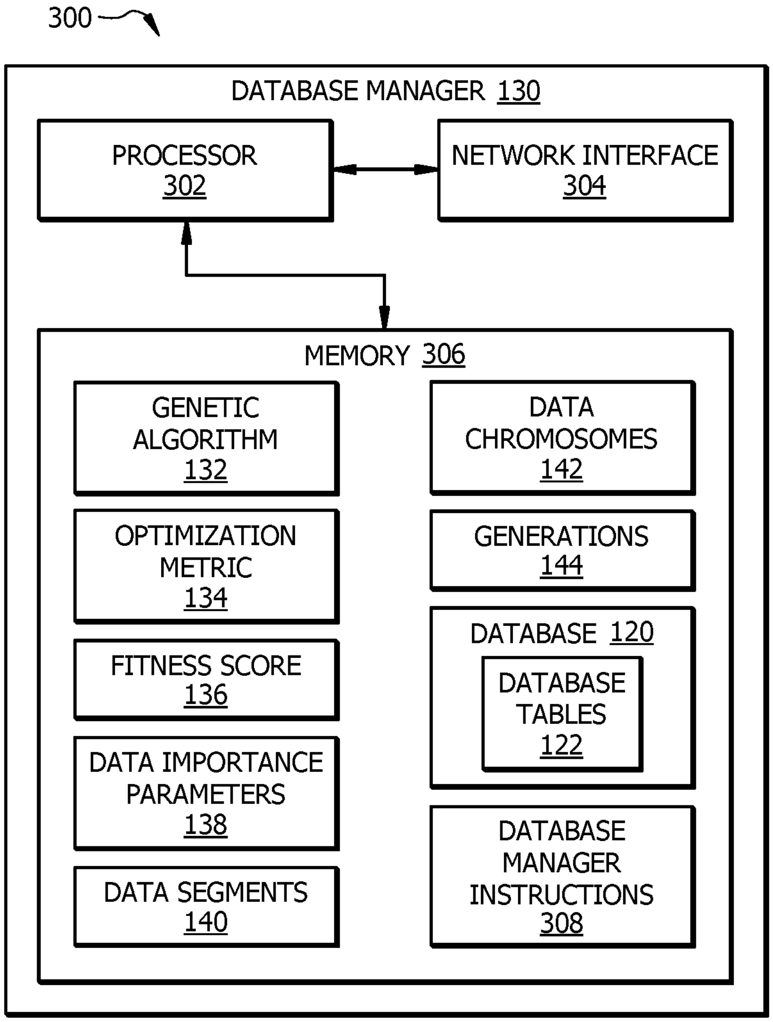
FIG. 3 illustrates an example schematic diagram of the database manager illustrated in FIG. 1, in accordance with one or more embodiments of the present disclosure.

FIG. 3 illustrates an example schematic diagram 300 of the database manager 130 illustrated in FIG. 1, in accordance with one or more embodiments of the present disclosure.

Database manager 130 includes a processor 302, a memory 306, and a network interface 304. The database manager 130 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., database manager instructions 308) to implement the database manager 130. In this way, processor 302 may be a special-purpose computer designed to implement the functions disclosed herein. In one or more embodiments, the database manager 130 is implemented using logic units, FPGAs, ASICs, DSPs, or any other suitable hardware. The database manager 130 is configured to operate as described with reference to FIGS. 1-2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the database 120 including the database tables 122, genetic algorithm 132, optimization metric 134, fitness score 136, data importance parameters 138, data segments, 140, data chromosomes 142, generations 144 and the database manager instructions 308. The database manager instructions 308 may include any suitable set of instructions, logic, rules, or code operable to execute the database manager 130.

The network interface 304 is configured to enable wired and/or wireless communications. The network interface 304 is configured to communicate data between the database manager 130 and other devices, systems, or domains (e.g. user devices 150). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the database system 110 and user devices 150 may be implemented similar to the database manager 130. For example, the database system 110 and each user device 150 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a database that stores data; and at least one processor communicatively coupled to the database and configured to:

randomly segment the data into a plurality of data segments, wherein:

each data segment represents a data gene for a genetic algorithm;

each data segment comprises a data type corresponding to a column of a database table or a data record corresponding to a row of that database table stored in the database; and the genetic algorithm simulates natural selection;

randomly combine the data segments into a plurality of data chromosomes, wherein:

each data chromosome includes a plurality of data segments; and the plurality of data chromosomes represents an initial generation for the genetic algorithm;

determine an optimization metric for each data segment of the plurality of data chromosomes in the initial generation, wherein the optimization metric of a data segment indicates to what degree the data segment satisfies an optimization criteria;

perform at least one iteration of the genetic algorithm comprising:

select one or more data segments having the highest optimization metrics from data chromosomes of a previous generation;

generate, based on the selected one or more data segments, a new set of data chromosomes using one or more of a cross-over operator and a mutation operator, wherein:

generating the new set of data chromosomes comprises replacing at least one data segment with a corresponding data segment from the one or more selected data segments having the highest optimization metrics; and the new set of data chromosomes represents a next generation; and determine the optimization metric for each data segment of the data chromosomes from the next generation, wherein the next generation is the previous generation for the next iteration of the genetic algorithm;

detect that the genetic algorithm has converged;

for each data segment of the one or more data segments included in the initial generation:

determine a fitness score, wherein the fitness score of the data segment is a number of iterations of the genetic algorithm the data segment was not eliminated;

determine whether the fitness score of that data segment equals or is below a threshold fitness score;

in response to determining that the fitness score equals or is below the threshold fitness score:

determine whether that data segment is needed for at least one processing step of at least one software application;

upon determining that the data segment is needed for the at least one processing step:

determine a degree of impact associated with deleting the data segment on a computing infrastructure; and delete the data segment from the database when the degree of impact equals or is below an impact threshold; and delete the data segment upon determining that the data segment is not needed for any processing step of any software application.

2. The system of claim 1, wherein the at least one processor is further configured to:

in response to determining that the degree of impact equals or is below the impact threshold, request approval for deleting the data segment;

receive the approval for deleting the data segment; and delete the data segment in response to receiving the approval.

3. The system of claim 1, wherein the at least one processor is further configured to:

in response to determining the degree of impact exceeds the impact threshold, request increase in storage space for the database to continue storing the data segment.

4. The system of claim 1, wherein the at least one processor is further configured to:

for each of one or more data segments stored in the database:

obtain the fitness score of the data segment;

determine whether the fitness score of the data segment equals or is below a threshold fitness score; and delete the data segment when the fitness score equals or is below the threshold fitness score.

5. The system of claim 1, wherein the optimization criteria comprises a plurality of parameters that indicate an importance of the data segments.

6. The system of claim 1, wherein the at least one processor is further configured to:

detect that a difference between data segments of two consecutive generations of the genetic algorithm equals or is below a threshold difference; and in response, determine that the genetic algorithm has converged.

7. The system of claim 1, wherein the at least one processor is configured to generate the new set of data chromosomes using the cross-over operator by replacing one or more data segments from at least one data chromosome of the previous generation with the one or more selected data segments having the highest optimization metrics from data chromosomes of the previous generation.

8. The system of claim 1, wherein the at least one processor is configured to generate the new set of data chromosomes using the mutation operation by:

randomly selecting one or more data segments from the initial generation or the previous generation; and replacing one or more data segments from at least one data chromosome of the previous generation with the one or more randomly selected data segments.

9. A method for managing data stored in a database, comprising:

randomly segmenting the data into a plurality of data segments, wherein:

each data segment represents a data gene for a genetic algorithm;

each data segment comprises a data type corresponding to a column of a database table or a data record corresponding to a row of that database table stored in the database; and the genetic algorithm simulates natural selection;

randomly combining the data segments into a plurality of data chromosomes, wherein:

each data chromosome includes a plurality of data segments; and the plurality of data chromosomes represents an initial generation for the genetic algorithm;

determining an optimization metric for each data segment of the plurality of data chromosomes in the initial generation, wherein the optimization metric of a data segment indicates to what degree the data segment satisfies an optimization criteria;

performing at least one iteration of the genetic algorithm comprising:

selecting one or more data segments having the highest optimization metrics from data chromosomes of a previous generation;

generating, based on the selected one or more data segments, a new set of data chromosomes using one or more of a cross-over operator and a mutation operator, wherein:

generating the new set of data chromosomes comprises replacing at least one data segment with a corresponding data segment from the one or more selected data segments having the highest optimization metrics; and the new set of data chromosomes represents a next generation; and determining the optimization metric for each data segment of the data chromosomes from the next generation, wherein the next generation is the previous generation for the next iteration of the genetic algorithm;

detecting that the genetic algorithm has converged;

for each data segment of the one or more data segments included in the initial generation:

determining a fitness score, wherein the fitness score of the data segment is a number of iterations of the genetic algorithm the data segment was not eliminated;

determining whether the fitness score of that data segment equals or is below a threshold fitness score;

in response to determining that the fitness score equals or is below the threshold fitness score:

determining whether that data segment is needed for at least one processing step of at least one software application;

upon determining that the data segment is needed for the at least one processing step:

determining a degree of impact associated with deleting the data segment on a computing infrastructure; and deleting the data segment from the database when the degree of impact equals or is below an impact threshold; and deleting the data segment upon determining that the data segment is not needed for any processing step of any software application.

10. The method of claim 9, further comprising:

in response to determining that the degree of impact equals or is below the impact threshold, requesting approval for deleting the data segment;

receiving the approval for deleting the data segment; and deleting the data segment in response to receiving the approval.

11. The method of claim 9, further comprising:

in response to determining the degree of impact exceeds the impact threshold, requesting increase in storage space for the database to continue storing the data segment.

12. The system of claim 9, further comprising:

for each of one or more data segments stored in the database:

obtaining the fitness score of the data segment;

determining whether the fitness score of the data segment equals or is below a threshold fitness score; and deleting the data segment when the fitness score equals or is below the threshold fitness score.

13. The system of claim 9, wherein the optimization criteria comprises a plurality of parameters that indicate an importance of the data segments.

14. A non-transitory computer-readable medium for managing data stored in a database, wherein the computer-readable medium stores instructions which when executed by a processor perform a method comprising:

randomly segmenting the data into a plurality of data segments, wherein;

each data segment represents a data gene for a genetic algorithm;

each data segment comprises a data type corresponding to a column of a database table or a data record corresponding to a row of that database table stored in the database; and the genetic algorithm simulates natural selection;

randomly combining the data segments into a plurality of data chromosomes, wherein:

each data chromosome includes a plurality of data segments; and the plurality of data chromosomes represents an initial generation for the genetic algorithm;

determining an optimization metric for each data segment of the plurality of data chromosomes in the initial generation, wherein the optimization metric of a data segment indicates to what degree the data segment satisfies an optimization criteria;

performing at least one iteration of the genetic algorithm comprising:

selecting one or more data segments having the highest optimization metrics from data chromosomes of a previous generation;

generating, based on the selected one or more data segments, a new set of data chromosomes using one or more of a cross-over operator and a mutation operator, wherein:

generate the new set of data chromosomes comprises replacing at least one data segment with a corresponding data segment from the one or more selected data segments having the highest optimization metrics; and the new set of data chromosomes represents a next generation; and determining the optimization metric for each data segment of the data chromosomes from the next generation, wherein the next generation is the previous generation for the next iteration of the genetic algorithm;

detecting that the genetic algorithm has converged;

for each data segment of the one or more data segments included in the initial generation:

determining a fitness score, wherein the fitness score of the data segment is a number of iterations of the genetic algorithm the data segment was not eliminated; and determining whether the fitness score of that data segment equals or is below a threshold fitness score;

in response to determining that the fitness score equals or is below the threshold fitness score:

determining whether that data segment is needed for at least one processing step of at least one software application;

upon determining that the data segment is needed for the at least one processing step:

determining a degree of impact associated with deleting the data segment on a computing infrastructure; and deleting the data segment from the database when the degree of impact equals or is below an impact threshold; and deleting the data segment upon determining that the data segment is not needed for any processing step of any software application.

15. The non-transitory computer-readable medium of claim 14, further comprising instructions for:

in response to determining that the degree of impact equals or is below the impact threshold, requesting approval for deleting the data segment;

receiving the approval for deleting the data segment; and deleting the data segment in response to receiving the approval.

16. The non-transitory computer-readable medium of claim 14, further comprising instructions for:

in response to determining the degree of impact exceeds the impact threshold, requesting increase in storage space for the database to continue storing the data segment.

17. The non-transitory computer-readable medium of claim 14, further comprising instructions for:

for each of one or more data segments stored in the database:

obtaining the fitness score of the data segment;

determining whether the fitness score of the data segment equals or is below a threshold fitness score; and deleting the data segment when the fitness score equals or is below the threshold fitness score.

* * * * *